US011453798B2

(12) United States Patent
Saha et al.

(10) Patent No.: US 11,453,798 B2
(45) Date of Patent: Sep. 27, 2022

(54) FORMALDEHYDE FREE BINDER AND MULTI-COMPONENT NANOPARTICLE

(71) Applicant: ECOSYNTHETIX LTD., Lansing, MI (US)

(72) Inventors: Uttam Kumar Saha, Thornhill (CA); Steven Bloembergen, Okemos, MI (US)

(73) Assignee: ECOSYNTHETIX LTD., Lansing, MI (US)

( * ) Notice: Subject to any disclaimer, the term of this patent is extended or adjusted under 35 U.S.C. 154(b) by 266 days.

(21) Appl. No.: 15/100,512

(22) PCT Filed: Dec. 5, 2013

(86) PCT No.: PCT/US2013/073341
§ 371 (c)(1),
(2) Date: May 31, 2016

(87) PCT Pub. No.: WO2015/084372
PCT Pub. Date: Jun. 11, 2015

(65) Prior Publication Data
US 2016/0297983 A1 Oct. 13, 2016

(51) Int. Cl.
C09D 103/02 (2006.01)
B29B 7/90 (2006.01)
B29B 7/38 (2006.01)
D04H 1/64 (2012.01)
C09J 103/02 (2006.01)
D04H 1/587 (2012.01)
C08B 31/00 (2006.01)
C09D 161/02 (2006.01)
B29B 7/46 (2006.01)

(52) U.S. Cl.
CPC ............ C09D 103/02 (2013.01); B29B 7/38 (2013.01); B29B 7/90 (2013.01); C08B 31/003 (2013.01); C09D 161/02 (2013.01); C09J 103/02 (2013.01); D04H 1/587 (2013.01); D04H 1/64 (2013.01); B29B 7/46 (2013.01)

(58) Field of Classification Search
CPC .... B29B 7/46; B29B 7/90; B29B 7/38; C08B 31/003; C09D 161/02; C09D 103/02; D04H 1/64; D04H 1/587; C09J 103/02
See application file for complete search history.

(56) References Cited

U.S. PATENT DOCUMENTS

| 3,869,296 A | 3/1975 | Kelly, Jr. et al. |
| 4,014,426 A | 3/1977 | Neufeld |
| 4,014,726 A | 3/1977 | Fargo |
| 4,126,512 A | 11/1978 | Hill |
| 4,135,029 A | 1/1979 | Pfeffer |
| 4,258,098 A | 3/1981 | Bondoc et al. |
| 4,308,165 A | 12/1981 | Vassiliades et al. |
| 4,324,833 A | 4/1982 | Yau |
| 4,366,096 A | 12/1982 | Abrams et al. |
| 4,430,158 A | 2/1984 | Jackey et al. |
| 4,455,416 A | 6/1984 | Floyd et al. |
| 4,542,068 A | 9/1985 | Whichard |
| 4,968,746 A | 11/1990 | Derudder et al. |
| 5,026,746 A | 6/1991 | Floyd et al. |
| 5,389,716 A | 2/1995 | Graves |
| 5,674,937 A | 10/1997 | Berg et al. |
| 5,736,209 A | 4/1998 | Andersen et al. |
| 5,914,365 A | 6/1999 | Chang et al. |
| 5,977,232 A | 11/1999 | Arkens et al. |
| 6,068,882 A | 5/2000 | Ryu |
| 6,084,021 A | 7/2000 | Chang et al. |
| 6,221,973 B1 | 4/2001 | Arkens et al. |
| 6,331,350 B1 | 12/2001 | Taylor et al. |
| 6,642,299 B2 | 11/2003 | Wertz et al. |
| 6,667,386 B1 | 12/2003 | Queisser et al. |
| 6,677,386 B1 | 1/2004 | Giezen et al. |
| 6,677,836 B2 | 1/2004 | Uchiyama et al. |
| 6,755,915 B1 | 6/2004 | Van Soest et al. |

(Continued)

FOREIGN PATENT DOCUMENTS

| CN | 102019697 A | 4/2011 |
| EP | 0354023 A2 | 2/1990 |

(Continued)

OTHER PUBLICATIONS

"Rice Starch Amylopectin, and Amylose: Molecular Weight and Solubility in Dimethyl Sulfoxide-Based Solvents", Zhong et al. Feb. 2006.*
Bloembergen et al., "Biolatex Binders for Paper and Paperboard Applications," Journal of Pulp and Paper Science, Jan. 2010, vol. 36 (3), pp. 1-11.
Bloembergen et al, Paper360 , 3(9), pp. 46-48, 2008.
Bloembergen, et al., "Specialty Biobased Monomers and Emulsion Polymers Derived from Starch," Presented to the PTS Advanced Coating Fundamentals Symposium, Munich, Germany, Oct. 11-14, 2010, pp. 1-19.

(Continued)

Primary Examiner — Angela C Scott

(57) ABSTRACT

This patent describes formaldehyde free or formaldehyde reduced binders useful, for example, in a fiber based composite material such as glass or other mineral fiber insulation, non-woven fabric or wood-based board. In one example, melamine is used as an acidic solution or a salt. The salt or solution is used to create an aqueous binder with other components such as a polyol and a crosslinker. A preferred polyol is a nanoparticle comprising high molecular weight starch. In other examples, binders include mixtures of a polyol with urea and a crosslinker. In other examples, a multi-component nanoparticle is made by reacting a polyol such as starch in an extruder with an insolubilizer such as melamine or urea. The resulting particles are mixed with water, optionally with other components such as an additional crosslinker, to create an aqueous binder.

9 Claims, No Drawings

(56) References Cited

U.S. PATENT DOCUMENTS

| | | | |
|---|---|---|---|
| 6,818,686 | B1 | 11/2004 | Colpaert et al. |
| 6,825,252 | B2 | 11/2004 | Helbling et al. |
| 6,884,849 | B2 | 4/2005 | Chen et al. |
| 6,921,430 | B2 | 7/2005 | Bloembergen et al. |
| 7,160,420 | B2 | 1/2007 | Helbling et al. |
| 7,238,402 | B2 | 7/2007 | Swales et al. |
| 7,268,091 | B2 | 9/2007 | Xing et al. |
| 7,272,915 | B2 | 9/2007 | Peng |
| 7,832,983 | B2 | 11/2010 | Kruckenberg et al. |
| 7,854,980 | B2 | 12/2010 | Jackson et al. |
| 8,133,952 | B2 | 3/2012 | Pisanova et al. |
| 8,137,731 | B2 | 3/2012 | Pater et al. |
| 2003/0008586 | A1 | 1/2003 | Kajander et al. |
| 2004/0011487 | A1 | 1/2004 | Helbling et al. |
| 2004/0014844 | A1 | 1/2004 | Helbling et al. |
| 2004/0038017 | A1 | 2/2004 | Tutin et al. |
| 2004/0082241 | A1 | 4/2004 | Rodrigues |
| 2004/0231559 | A1 | 11/2004 | Bloembergen et al. |
| 2004/0241381 | A1 | 12/2004 | Chen |
| 2004/0241382 | A1 | 12/2004 | Bloembergen et al. |
| 2005/0061203 | A1 | 3/2005 | Helbling et al. |
| 2005/0202258 | A1 | 9/2005 | Swales et al. |
| 2005/0214534 | A1 | 9/2005 | Adamo et al. |
| 2005/0255316 | A1 | 11/2005 | Puckett |
| 2006/0251819 | A1 | 11/2006 | Zama et al. |
| 2006/0252855 | A1 | 11/2006 | Pisanova et al. |
| 2007/0014236 | A1 | 1/2007 | Jang et al. |
| 2007/0142596 | A1 | 6/2007 | Swift et al. |
| 2007/0284120 | A1 | 12/2007 | Rowen |
| 2008/0051539 | A1 | 2/2008 | Kelly |
| 2008/0160289 | A1 | 7/2008 | Lin |
| 2008/0248303 | A1 | 10/2008 | Maurer |
| 2009/0042003 | A1 | 2/2009 | Govang et al. |
| 2009/0252962 | A1 | 10/2009 | Michl et al. |
| 2010/0080976 | A1 | 4/2010 | Jackson et al. |
| 2010/0143738 | A1 | 6/2010 | Bloembergen et al. |
| 2010/0330376 | A1 | 12/2010 | Trksak et al. |
| 2011/0003522 | A1 | 1/2011 | Chen et al. |
| 2011/0021101 | A1 | 1/2011 | Hawkins et al. |
| 2011/0042841 | A1 | 2/2011 | Wildi et al. |
| 2011/0086567 | A1 | 4/2011 | Hawkins et al. |
| 2011/0086949 | A1 | 4/2011 | Mentink et al. |
| 2011/0196071 | A1 | 8/2011 | Mentink et al. |
| 2011/0300394 | A1 | 12/2011 | Welsch et al. |
| 2012/0141551 | A1 | 6/2012 | Bloembergen et al. |
| 2012/0309246 | A1 | 12/2012 | Tseitlin et al. |
| 2014/0295090 | A1* | 10/2014 | Tseitlin ............... C08J 5/24 427/389.9 |

FOREIGN PATENT DOCUMENTS

| | | |
|---|---|---|
| EP | 0700673 A1 | 3/1996 |
| EP | 1114003 A1 | 7/2001 |
| EP | 1159301 A1 | 12/2001 |
| EP | 1114003 B1 | 6/2002 |
| EP | 1892273 A2 | 2/2008 |
| EP | 2230222 A1 | 9/2010 |
| EP | 2540773 A1 | 1/2013 |
| GB | 1420392 A | 1/1976 |
| GB | 2451719 A | 2/2009 |
| JP | H04202302 A | 7/1992 |
| JP | H11256477 A | 9/1999 |
| JP | 2002544335 A | 12/2002 |
| JP | 2004532146 A | 10/2004 |
| JP | 2005505639 A | 2/2005 |
| RU | 2142878 C1 | 12/1999 |
| WO | 9412328 A1 | 6/1994 |
| WO | 0040617 A1 | 7/2000 |
| WO | 0069916 A1 | 11/2000 |
| WO | 02087868 A1 | 11/2002 |
| WO | 02088271 A1 | 11/2002 |
| WO | 03106561 A1 | 12/2003 |
| WO | 2004003025 A1 | 1/2004 |
| WO | 2006120523 A1 | 11/2006 |
| WO | 2008022127 A2 | 2/2008 |
| WO | 2010065750 A1 | 6/2010 |
| WO | 2010084060 A1 | 7/2010 |
| WO | 2010084088 A2 | 7/2010 |
| WO | 2010114698 A1 | 10/2010 |
| WO | 2010132641 A1 | 11/2010 |
| WO | 2011071742 A2 | 6/2011 |
| WO | 2011109331 A2 | 9/2011 |
| WO | 2011155979 A2 | 12/2011 |
| WO | 2012162645 A2 | 11/2012 |
| WO | 2012162845 A1 | 12/2012 |

OTHER PUBLICATIONS

European Patent Application No. 12793944, Supplementary European Search Report dated Mar. 11, 2015.
European Patent Application No. 13898827.4, Supplementary European Search Report dated Jan. 30, 2018.
Figliolino et al. Reducing Carbon Footprint with Biolatex, Paper360 Magazine, Aug. 2009, pp. 25-28.
Formaldehyde Gas. Report on Carcinogens, 12th Edition, National Toxicology Program, [online], 2011. Retrieved from the Internet: .
Giezen, EP990200203, Jan. 13, 2004.
Greenal, et al., "New Generation of Biobased Latex Coating Binders for a Sustainable Future," Paper Technology 52, No. 1, Feb. 2011, Paper Industry Ass'n, pp. 10-14.
IARC 2004. IARC Classifies Formaldehyde as Carcinogenic to Humans. IARC Press Release No. 153. International agency for Research on Cancer, available at [online]. Retrieved from the Internet:.
International Patent Application No. PCT/CA2012/050375, International Preliminary Report on Patentability dated Dec. 19, 2013.
International Patent Application No. PCT/CA2012/050375, International Search Report and Written Opinion dated Oct. 11, 2012.
International Patent Application No. PCT/US2013/053209, International Search Report and Written Opinion dated Jan. 10, 2014.
International Patent Application No. PCT/US2013/073341, International Preliminary Report on Patentability and Written Opinion dated Jun. 16, 2016.
International Patent Application No. PCT/US2013/073341, International Search Report and Written Opinion dated Aug. 22, 2014.
Japanese Patent Application No. 2014-513019, Office Action dated May 31, 2016.
Japanese Patent Application No. 2014-513019, Office Action dated Nov. 1, 2016.
Jones, N., et al., "Targeted Drug Delivery Using Aptamer Functionalized Crosslinked Starch Nanoparticles", pp. 1-13.
Klass, "New Nanoparticle Latex Offers Natural Advantage," Paper360 Magazine, Jan. 2007, p. 30-31.
Lee et al., "Development of New Biobased Emulsion Binders," Presented At Papercon 2010, Talent, Technology And Transformation, Altanta, GA, May 2-5, 2010.
Oberndorfer et al., "Coating & Amp; Print Performance of Biobased Latex in European Graphic Papers", PaperCon2011, Rethink Paper: Lean and Green, Cincinnati, OH, May 1-5, 2011.
Owens Corning, Residential Insulation—EcoTouch Pink Fiberglas Insulation, p. 1-2, Retrieved from the Internet May 25, 2012.
Rojas et al, International Journal of Pharmaceutical Sciences Review and Research, vol. 8, issue 1, May-Jun. 2011, pp. 28-36.
Russian Patent Application No. 2013152008, Office Action dated May 25, 2016.
Song et al., "Starch Nanoparticle Formation via Reactive Extrusion and Related Mechanism Study," Carbohydrate Polymers, Apr. 2011, vol. 85 (15), pp. 208-214.
Song, "Starch crosslinking for cellulose fibre modification and starch nanoparticle formation", Georgia Institute of Technology. Retrieved from the Internet:. May 2011.
Tseitlin, "Biolatex Binders: Next Generation Breakthrough using Nano-Starch Dispersions" EcoSynthetix-Sustainable Polymers for Plant Earth, INDA's Rise 2011 Conference, Oct. 5, 2011.
U.S. Appl. No. 14/123,150, Notice of Allowance dated Oct. 21, 2016.
U.S. Appl. No. 14/123,150, Office Action dated Aug. 5, 2016.

(56) References Cited

OTHER PUBLICATIONS

U.S. Appl. No. 13/486,555, Examinees Answer to Appeal Brief dated Nov. 23, 2015.
U.S. Appl. No. 13/486,555, Final Office Action dated Oct. 20, 2014.
U.S. Appl. No. 13/486,555, Non-Final Office Action dated Apr. 10, 2013.
U.S. Appl. No. 13/486,555, Non-Final Office Action dated Feb. 23, 2018.
U.S. Appl. No. 13/486,555, Non-Final Office Action dated Jan. 15, 2014.
U.S. Appl. No. 13/486,555, Final Office Action dated Oct. 31, 2018.
U.S. Appl. No. 13/486,555, Non-Final Office Action dated Jun. 27, 2019.
U.S. Appl. No. 13/486,555, Final Office Action dated Feb. 20, 2020.
U.S. Appl. No. 13/486,555, Non Final Office Action dated Nov. 13, 2020.
U.S. Appl. No. 13/486,555, Non Final Office Action dated Jun. 24, 2021.
U.S. Appl. No. 13/486,555, Final Office Action dated Jan. 21, 2022.

* cited by examiner ns or with solid sheets or pieces as used in plywood, particle board, strand board and other wood-based boards.

FORMALDEHYDE FREE BINDER AND MULTI-COMPONENT NANOPARTICLE

RELATED APPLICATION

This application is a National Stage Entry of International Application No. PCT/US2013/073341, filed Dec. 5, 2013, which is incorporated by reference.

FIELD

This specification relates to thermosetting resins or binders and to composite products combining a cured binder and fibers.

BACKGROUND

Urea formaldehyde, urea melamine formaldehyde, phenol formaldehyde and phenol urea formaldehyde have been traditionally used as binders in making fiber glass insulation and wood-based board products. However, formaldehyde has been classified by the International Agency for Research on Cancer as a known human carcinogen. Formaldehyde is also a volatile substance that can be emitted from manufacturing plants and into indoor air, particularly from urea-formaldehyde insulation products. Accordingly, while the U.S. Consumer Products Safety Commission has stated that fiberglass insulation products have little impact on free formaldehyde levels in homes, the insulation industry has been experimenting with essentially formaldehyde free binders. For example, other polymers such as polyacrylic acid, polyvinyl acetate and polyester have been used to create formaldehyde free or reduced binders, alternatively called "no added formaldehyde" binders. However, these polymers are expensive, release some volatile compounds, and in some cases their acidity can damage manufacturing equipment and metal structures being insulated.

The non-formaldehyde polymers mentioned above are also typically made from petroleum and so are subject to concerns over the long term price, availability and environmental impact of using petroleum derived products. Some attempts have therefore been made to produce binders that are not only formaldehyde free, but also include bio-based materials. In one example, US Publication 2011/0021101, Modified Starch Based Binder, describes a binder for glass fibers including chemically modified starch, a silane coupling agent and, optionally, a crosslinking agent. The starch is modified by oxidation, bleaching, or acid or base treatment to have a degree of polymerization between 20 and 4000. The modified starch is water dispersible and has a reduced viscosity. In another example, U.S. Pat. No. 7,854,980, Formaldehyde-free Mineral Fibre Insulation Product, describes a binder made up of dextrose monohydrate, anhydrous citric acid, ammonia and a silane.

INTRODUCTION

The following introduction is intended to introduce the reader to the detailed description to follow, and not to limit or define any claimed invention.

Many composite materials are made by combining fibers with a binder, and then curing the binder. The fibers may be natural (plant or mineral based) or synthetic fibers. The fibers may also be in various forms, for example loose mats as used in fiberglass or mineral fiber insulation, dense matts as used in roofing shingles, looser matts used to make non-woven fabrics, or with solid sheets or pieces as used in plywood, particle board, strand board and other wood-based boards.

In most cases, a binder is applied to the fibers as an aqueous composition. Shipping an aqueous composition from a factory where the composition was manufactured to a factory where a composite material will be manufactured is undesirable. The excess weight and volume required to ship the water in the aqueous composition increases the cost of shipping. Some aqueous compositions are also unstable over long periods of time. It is therefore preferable to ship a concentrated or dried composition, or to ship components of the composition separately, with each component in a dry or concentrated form. However, some factories that manufacture composite materials are not equipped to create aqueous compositions beyond taking simple steps, for example mixing a set of ingredients together and diluting with water. Accordingly, it is desirable to provide a binder that does not require shipping aqueous components, or at least involves shipping only small quantities of stable aqueous components, and requires only simple procedures to prepare at a site where the binder will be used.

This specification describes a formaldehyde-free or formaldehyde-reduced binder made using a polyol bonded to a second compound. The second compound is optionally a small molecule (i.e. with a molecular weight of less than 1000 g/mol) prior to being bonded to the polyol. The second compound preferably makes the polyol more hydrophobic or otherwise increases its water resistance. Exemplary second compounds include amine or amide compounds such as urea, melamine and nitrogen heterocycles that have reactive amine functionality, and mixtures thereof. The second compound preferably makes up 10-50 wt % or 20-40 wt % of the total solids in the binder.

Unfortunately, urea releases ammonia when cured at some temperatures. Melamine is stable up to much higher temperatures, but melamine is however not easily soluble in water. In order to use melamine in a binder composition, in one method described herein an acidic melamine solution is prepared. In another method described herein, melamine is converted into a salt with an acid. In order to use urea in a binder composition, in one method described herein the total amount of urea is limited (preferably less than 40 wt %, i.e. 20-40 wt %) and the binder is strengthened with small (less than 10 wt % each) amounts of citric acid and a stiffening agent. The binder may also contain an additional crosslinker or a stiffening agent or both. The stiffening agent may be, for example, polyacrylic acid (PAA) or polyvinyl alcohol (PVOH), added to provide 0.5 to 10 wt % of the total solids in the binder. Preferred polyols include carbohydrates or other polysaccharides such as starch. Carbohydrates preferably have a high molecular weight (greater than 100,000 or, preferably, 1,000,000 g/mol). The polyol is preferably provided as a colloid or latex forming particle, for example a regenerated starch or other biopolymer particle. The binder is applied to fibers and cured, for example by heating.

This specification also describes a multi-component nanoparticle and a process of making it. For example, a second compound as described above may be bonded with a polyol in an extruder. A preferred polyol is starch, such as native granules of corn starch. An acid may be added in the extruder to solubilize melamine or to provide crosslinking or both. The dispersible particles are more hydrophobic than particles made without the second compound and may be used as a latex binder alone or in a mixture with a crosslinking agent. The particles are mixed with water, and optionally a crosslinker, and applied to the fibers or another substrate. The binder is then cured, for example by heating, to dry the latex and, optionally, to activate a crosslinking agent in solution with the water. Optionally, the binder may include a stiffening agent as described above.

The binders described above can be used essentially alone (wherein the binder comprises 80 wt % or more of the total dry solids in the binder), completely alone, or in mixtures or blends with a co-binder. For example, one optional co-binder is a urea formaldehyde (UF), phenol formaldehyde (PF), urea melamine formaldehyde (UMF) or phenol urea formaldehyde (PUF) resin, or a mixture thereof, making up 25-75 wt % of the total solids in the binder. Another optional co-binder is an SB or SA latex making up 25-75 wt % of the total solids in the binder.

The binders described above may be used to create formaldehyde-reduced or essentially formaldehyde free (less than 5 wt % or less than 1 wt % formaldehyde) binders and composite products comprising the cured binder and one or more types of fibers.

DETAILED DESCRIPTION

International Publication Number WO 2012/162845 A1, A Curable Sheared or Extruded, Cross Linked Starch Nanoparticle Latex Binder for use with Mineral, Natural Organic or Synthetic Fibre Products and Non-Woven Matts, is incorporated herein by reference. U.S. patent application Ser. No. 13/957,555, Bio-Based Binder and Fiberglass Insulation, filed on Aug. 2, 2013, is incorporated herein by reference.

The word "fibers" as used herein includes natural (plant, animal or mineral based) fibers, synthetic fibers (i.e. polyester or other thermoplastic fibers), and wood-based materials (such as veneers, wood chips, wood shavings or strips, sawdust, etc.) unless a specific type of fiber is mentioned. Some examples of fibers include glass fibers, other mineral fibers, cellulose, sisal, wool, jute, melt-spun polyolefins, polyesters, acrylics, nylon and polyamides, and the wood products mentioned above and mixtures thereof.

Composite materials are made by combining fibers and a binder, alternatively called a thermosetting resin, and curing the binder. Curing temperatures typically range from 110 or 130 degrees C. to 230 degrees C. Solids content of the binder on application to the fibers ranges from a low of 5 wt % in some fiberglass thermal insulation products or non-woven fabrics to 70 wt % in some wood-based products. Unless stated otherwise or apparent from the context, all wt % values given to a compound in this specification indicate the mass of the compound as a percentage of the mass of the total solids in a binder on a dry solids basis.

In the case of glass or mineral fiber thermal insulation, the binder is typically sprayed onto molten fibers as they are sprayed onto a conveyor belt. The mass of fibers and binder then travels on the conveyor belt through forming and compression devices and a curing oven. After curing, the loose bats are cooled, shaped or cut, and packaged. A suitable binder preferably generates sufficient strength when used at a total solids content of between 6 wt % and 25 wt %. Fiberglass insulation in particular is typically cured at about 180 to 200 degrees C. Viscosity when sprayed is preferably 500 cps or less.

Non-woven fabrics are often made of synthetic fibers, for example fibers comprising a polyester such as PET. The fibers may be assembled into the nonwoven by carding or by any other known process for making nonwoven fabrics. The binder may be applied to the non-woven fabric in a liquid form, for example by spraying, at about 5-50% solids. The liquid binder flows to intersections between fibers before being cured by heating to stabilize the fabric. Other non-woven fabrics are made by coating or casting a binder on the fibers or by other methods.

To make roofing shingles, mineral, natural organic or synthetic fibers (typically glass fibers) are formed into a slurry and placed on a support to form a mat. A binder is then coated on the mat and cured. The bonded mat is then covered with bitumen or asphalt. In wood based products, the binder may be mixed with the wood pieces and formed into a sheet. The sheet is cured by compressing it while applying heat.

The binders described herein typically contain a polyol (meaning a compound with hydroxyl groups) and a second compound, optionally with a further crosslinker, in an aqueous solution or dispersion. The binder can be cured, for example by heat, to form a solidified binder. Starch is a preferred polyol but other polyols may be used such as a polyalcohol (i.e. polyethylene glycol), polyvinyl alcohol, other polysaccharides or carbohydrates, polyethylene oxide (PEO), polypropylene oxide (PPO), P(EO/PO), and mixtures thereof. Polysaccharides may be modified or derivatized, for example by etherification, esterification, acid hydrolysis, dextrinization, oxidation or enzyme treatment. The second compound may be, for example, an amine or amide compound such as melamine or urea, a nitrogen heterocycle that has reactive amine functionality, or a mixture thereof. In some cases, the second compound may react with functional groups of the polyol directly. Alternatively, or additionally, an additional crosslinker may react with functional groups of the polyol and the second compound.

Starch is a preferred polyol. However, native starch granules are not soluble and cooked starch is viscous, requires specialized equipment, and retrogrades to a gel when cooled or stored. Low molecular weight derivatives of starch such as dextran or dextrin may be used, as well as various commercially available chemically modified cold soluble starches. However, as indicated by the examples further below, these forms of starch do not form stable binders which might, depending on the process and equipment used, be a disadvantage in some methods of making composite (fiber and binder) products. In addition, the strength of the binder decreases when low molecular weight derivatives of starch are used.

A preferred form of the polyol is regenerated colloid forming particles, alternatively called latex forming particles. The particles are preferably made up of at least 50%, preferably at least 80% if the second compound is not part of the particle, by weight of starch with a high molecular weight, for example 100,000 g/mol or more or 1,000,000 g/mol or more. A preferred method of making the particles is by reactive extrusion of the starch with water under conditions sufficient to essentially destroy the structure of the crystalline regions of the native starch granule. Suitable conditions include a temperature of at least 40 degrees C., preferably at least 100 degrees C., for example 140 to 200 degrees C., and a specific mechanical energy of at least 100 J/g. A crosslinker may optionally be added to the extruder, preferably at a location where the starch has already been gelatinized, to internally crosslink the particles. Internally crosslinked particles are preferred, but optional particularly when corn starch such as waxy corn starch is used in the particles. An insolubilizer or crosslinker may optionally be added in a subsequent step in solution with the binder whether the particles are internally crosslinked or not.

Preferred methods of making regenerated starch particles by reactive extrusion are described in U.S. Pat. No. 6,677,386 and International Publication WO 2008/022127 which are incorporated by reference. The reaction product can be described as a regenerated starch particle because the original crystalline and amorphous structures in the starch are removed and a new structure is formed. Other methods of making regenerated starch particles are described, for example, in WO 2011/071742, WO 2011/155979, U.S. Pat. No. 6,755,915, WO 2010/084088 and WO 2010/065750. Optionally, other polyols or a mixture of polyols may also be used to make colloid forming particles. Fragmented starch particles (for example as described in GB 1420392) or starch nano-crystals might also be used.

The particles preferably have a volume average particle size as determined by dynamic laser light scattering (DLS), or a D50 value as determined by nanoparticle tracking analysis, of 1000 nm or less, preferably 400 nm or less. Regenerated starch nanoparticles can be stored and transported as an aggregate powder. Despite the high molecular weight of the starch, the powder readily disperses when mixed with water. A suitable product that is commercially available is EcoSphere™ dispersible powder, which is an internally crosslinked waxy corn starch based nanoparticle made by reactive extrusion and sold by EcoSynthetix Inc.

Binders having melamine as the second compound will be described first. Melamine is sparingly (0.3%) soluble in water but may be dissolved in water by adding an acid and heating the water. In one method, this solution is mixed with a polyol, preferably starch, and any other binder components to form an aqueous binder. The aqueous binder is applied to a fiber substrate and cured, for example by heating. A stiffening agent may also be added to increase the stiffness of the cured binder if desired. In particular, mineral (including glass) fiber insulation products are easier to install if the fiber bats are stiff. On the other hand, it may be desirable for a non-woven fabric to remain flexible for some applications and so a stiffener is not always added to the binder.

In some examples, hydrochloric acid (HCl) and melamine are mixed in hot water to dissolve the melamine. The resulting solution is mixed with a polyol, preferably in the form of colloid forming regenerated starch particles, and, preferably, an additional crosslinker such as glyoxal. Optionally, a stiffening agent, such as polyvinyl alcohol (PVOH), may be added. The resulting binder can be applied to fibers and cured by heating. Without intended to be limited by theory, the inventors believe that heating activates the glyoxal to crosslink the starch to the melamine and the fibers. It is also possible that there might be a direct reaction between melamine and starch during curing.

When using PVOH as a stiffening agent, higher molecular weight samples of PVOH produce slightly higher tensile strength in the binder. However, higher molecular weight PVOH is also less stable in dispersion after 24 hours. Accordingly, the molecular weight of the PVOH may be reduced, or a blend of PVOH samples may be used, if the aqueous binder will be stored for a long period of time between when the binder is prepared to when it is used. A polycarboxylated polymer, for example as described in U.S. Pat. No. 5,895,804, preferably polyacrylic acid (PAA), is another useful stiffening or strengthening agent. Other optional stiffening or strengthening agents include polystyreneacrylate (SA), polystyrenebutadiene (SB) and polyvinylacrylate (PVA). A stiffening or strengthening agent may be used in a wt % range of about 0.5% to 10% of the solids in the binder.

To make a binder including PVOH and melamine, additional steps are required to dissolve the PVOH. In one method, PVOH powder is mixed with water and heated, for example to about 90 degrees C., until a clear solution is formed. Melamine powder is then mixed into the solution. Aqueous HCl is added until a clear solution is again obtained, typically at a pH of about 3.0. The solution is then cooled to about 70 degrees C. Glyoxal or another crosslinker can be added, followed by EcoSphere™ powder or another form of polyol. EcoSphere™ powder is typically added in portions over about 30 minutes while mixing to disperse the starch particles. The resulting binder is ready to be applied to a fiber and cured. However, the resulting dispersion is stable at room temperature when colloid forming starch particles are used and can be applied to fibers at room temperature or stored for use later if desired. Optionally, PAA can be used in place of PVOH to avoid heating steps required to dissolve PVOH.

At reasonable melamine concentrations, after reaction with the other binder components, the acidic melamine results in a product that is stable at room temperature. For example, when melamine is dissolved with HCl at 60-70 or 80 degrees C., and solutions with up to 30 wt % melamine are used, the resultant binder is stable even after being cooled to room temperature. However, at 40 wt % melamine, the binder crystallizes at room temperature in about one hour. Accordingly, it is desirable to first prepare a melamine solution with excess water up to the amount that will be used in the final binder composition to reach a desired total solids concentration. If necessary, the remaining components of the binder are added in as dry a form as possible.

Transporting a melamine solution would be costly, and heating melamine on site with an acid is an inconvenient and unusual procedure at a composite material factory. To provide increased practical utility, binders were prepared using a melamine salt. The melamine salt is cold soluble, which allows a binder to be prepared without heating when other cold soluble or dispersible components are used. In particular, melamine hydrochloride (M.HCl) is cold soluble up to about 30 wt %. The salt can also be made to dissolve at higher solids concentrations, for example to a 40 wt % solution, by adding glyoxal to a solution or dispersion of M.HCl.

To produce a melamine salt, melamine is first dissolved in hot water with an acid. The resulting solution is then cooled until a melamine salt precipitates. The melamine salt is then separated from the water. The melamine salt can then be provided as an essentially dry component to be mixed with water and other components on site to produce an aqueous binder.

For example, melamine hydrochloride salt can be prepared by dissolving melamine in dilute hydrochloric acid at 85 to 90 degrees C. up to about 50 wt %. The increased temperature relative to the dissolution method described above allows melamine to be dissolved to a higher solids concentration. This is an advantage that more than offsets the disadvantage of higher temperature when the intent is to separate a precipitated melamine salt. When the solution is cooled to about 2 to 8 degrees C., melamine hydrochloride salt crystals precipitate. The crystals can be removed from the water by filtration and dried at room temperature. The salt can be dissolved in water and combined with other ingredients to produce a binder either off site or on site at a factory where the binder will be applied to fibers.

To provide a further improvement in ease of preparation on site, the melamine or another second compound can also be incorporated with a polyol into a colloid forming nanoparticle. For example, melamine can be co-extruded with native waxy corn starch granules, a crosslinker, water, optionally another plasticizer or processing aid and, if required, an acid. Citric acid is a preferred crosslinker and also provides for the acid in the extruder. In the extruder, heat and shear forces gelatinize the starch, help dissolve the melamine and provide conditions suitable for reaction between the melamine, crosslinker and starch. Without being limited by theory, the inventors believe that citric acid in particular helps dissolve the melamine and also acts as a crosslinker between melamine and starch. It is also possible that melamine may react, at least in part, with starch directly. The resulting multi-component nanoparticles are more hydrophobic than nanoparticles made with the polyol alone and may also be used in other applications beyond the binders described herein.

The extruder produces a concentrated dispersion of particles or particle agglomerates. The extrudate can be used as produced, or dried and ground into a powder for storage and shipping. When the powder or extrudate is mixed with water, the polyol-second compound particles disperse into a colloid. In the case of melamine, practical problems created by the low solubility of the second compound are avoided by incorporating the second compound in a dispersible particle. An additional crosslinker, such as glyoxal, can be added to the binder by dissolving it in water containing the particles. Shipping costs are reduced by shipping only the dried powder of particle agglomerates and a concentrated crosslinker solution. Preparation of the binder on site requires only mixing these two components into an appropriate amount of water. Heating is not required on site.

Urea may be used as an alternative second compound. Urea is inexpensive but releases ammonia when cured at some temperatures, for example 160 degrees C. or more. Some converters and manufacturing plants may be already operating with ammonia emissions. For example, wood board plants using UF resins already operate with ammonia emissions from their process. In addition, fiberglass manufacturing plants typically have ammonia emissions from their binder systems that need to be scrubbed or otherwise captured. This is because typically about 10 wt % urea is added to a predominately PF resin to help scavenge free formaldehyde in the PF resin as received, thereby creating a PUF resin. However, it is still preferable to reduce ammonia emissions.

Ammonia emissions can be reduced by using a moderate urea content, preferably less than 40 wt %, for example 20-40 wt %, with a polyol such as regenerated starch particles. This amount of urea and starch alone would produce a low strength binder relative to a binder with more urea. However, the strength of the binder is improved by adding 0.5-10 wt % of a crosslinker, for example citric acid, in solution with the water of the binder. The resulting binder can be further strengthened or stiffened by adding 0.5-10 wt % of a stiffening or strengthening agent such as PVOH or PAA resin. In this application, PAA is preferred since, being acidic, it might further reduce ammonia emissions.

The crosslinkers described herein can be referred to as internal (or intra-particle) and external (on inter-particle) crosslinkers. An internal crosslinker has been used in the process of making a particle, for example by adding it near or downstream from the feed zone of an extruder, preferably at a location where the starch has already been gelatinized, to internally crosslink the particles. The internal crosslinker tends to be completely reacted (although the reactions may be reversible) before the binder is applied to fibers. The external crosslinker, alternatively called an insolubilizer, is added after the reaction zone in an extruder, dissolved into water carrying a dispersion of the particles, or dissolved into water of the binder. The external crosslinker tends to be un-reacted, or only partially reacted, when the binder is applied to the fibers and remains at least partially dormant until curing. For example, the external crosslinker may be activated by heat on curing. In binders made without particles, all crosslinkers may be described as external crosslinkers.

Glyoxal and other aldehyde crosslinkers are suitable as an external or internal crosslinker. Glyoxal is conveniently available as a concentrated solution, for example at about 40 wt %. Glyoxal links hydroxyl groups of the polyol to amine groups of the second compound. Glyoxal can also bond many types of fibers. Citric acid is another crosslinker suitable as an external or internal crosslinker and capable of linking hydroxyl groups of the polyol to amine groups of the second compound. Glyoxal and citric acid are both particularly useful as external crosslinkers with wood, glass fiber insulation and other natural fibers. Polycarbodiimides are also useful as external crosslinkers with wood, glass fiber insulation and other natural fibers. Diphosphates and glycidyl type crosslinkers are useful as external crosslinkers with non-woven fabrics and wood-based products. Ammonium zirconium carbonate and potassium zirconium carbonate are useful as external crosslinkers with wood-based products. Organooxysilane crosslinkers such as TEOS (tetraethylenorthosilicate) and MTEOS (methyl-triethylorthosilicate) are useful as external crosslinkers with glass fiber insulation. Other possible external crosslinkers include hexamethoxymethylmelamine (HMMM), isocyanides, dialdehydes, polyaldehydes, glutaraldehyde, glyoxal, oxidized carbohydrates, periodate-oxidized carbohydrates, epichlorohydrin, epoxides, triphosphates, petroleum-based monomeric, oligomeric and polymeric crosslinkers, biopolymer crosslinkers, divinyl sulphone, borax, isocyanates, polyacids, ammonium zirconium carbonate (AZC) and hydrolysable organo alkoxy silanes producing silanols. Other possible internal crosslinkers include epichlorohydrin and other epoxides, triphosphates, divinyl sulphone, borax, AZC and KZC. Other additional possible external crosslinkers which may require higher temperature for curing include octenyl succinic anhydride (OSA), alkyl succinic anhydride (ASA), maleated co-polymers, acid anhydrides or mixed anhydrides, (e.g. succinic and maleic anhydride). Mixtures of crosslinkers may be used.

The external crosslinker, if any, may be provided in a wet or dry mixture with the latex forming particles. Optionally, external crosslinker, for example TEOS or glyoxal, may be mixed with latex forming particles by adding the external crosslinker to an extruder used to make the latex forming particles. The external crosslinker is added near the end of the extruder, beyond the reaction area where the latex forming particles are made, and where the temperature is below the heat activation temperature of the external crosslinker. The external crosslinker may be attached to or complexed with the latex forming particles, or merely mixed with them or provided in solution with water containing the particles. TEOS, for example, when mixed with water becomes hydrolyzed and attaches to hydroxyl groups in a polyol by hydrogen bond.

However, the external crosslinker does not fully react until it is heated and dried during curing in the presence of fibers.

In the binders described above, other acids may be used in place of HCl or CA. Suitable acids include, for example, $H_3PO_4$, malic acid and maleic acid or any di- or tri-carboxylic acid. Other organic polycarboxylic acids may also be used in place of citric acid. Sulfuric and phosphoric acid may be used to make melamine salt.

The binders described above or in the examples below can be used to make formaldehyde free resins, in particular resins with less than 5 wt % or less than 1 wt % of formaldehyde. A binder may consist essentially of the components described above or in an example below. For example, 80 wt % or more of the solids in a binder may be the components described above or in an example below. These binders may also be blended with UF, UMF, PUF or PF resins, for example in a ratio from 1:3 to 3:1, to make formaldehyde reduced resins. The binders may also be blended with a conventional latex binder, such as polystyreneacrylate (SA), polystyrenebutadiene (SB) and polyvinylacrylate (PVA) latex, for example in a ratio from 1:3 to 3:1. The specific binders described above and in the examples below are provided as examples or embodiments to help enable the invention but not to limit the invention, which is defined by the claims.

COMPARATIVE EXAMPLES

For comparison purposes, glass fiber paper (Whatman 934-AH) was soaked in conventional phenol urea formaldehyde (PUF) resin (10 wt % urea). Excess liquid was removed by vacuum and the paper was put into an over at 200 degrees C. for 10 minutes to cure the binder. After curing, the paper was cut into 6" by 1" (9 cm by 2.5 cm) test strips. For dry strength testing, the specimens were put into an Instron 3360 tensile tester and pulled until the specimen was ripped apart. The maximum force was recorded at the dry tensile strength. For wet strength testing, the specimens were soaked in water at 80 degrees C. for 5 minutes and then pulled until failure in the tensile tester while still wet. The maximum force was recorded as the wet tensile strength. The same procedure was followed with the further examples below that refer to results of glass fiber test strips unless stated otherwise.

The PUF resin samples produced averages of (a) 3.8 kgf wet strength and 6.2 kgf dry strength at a loss on ignition (L0I) of 28% and b) 4.0 kgf wet strength and 7.1 kgf dry strength at 31% LOI. When comparing the examples below to PUF resin, a comparative example with similar LOI is used or, if none is available, by comparing ratios of tensile strength to LOI using the comparative example with the closest LOI.

Example 1

Hydrochloric acid (HCl) was added to dispersions of melamine in water to produce a pH of 3 to 4 at 60 to 70 degrees C. The resulting melamine solution is mixed with EcoSphere™ starch-based nanoparticles and glyoxal (Gx) in various concentrations. The resulting binders were applied to glass fiber paper at a 10 wt % solids concentration and cured at 200 degrees C. for 10 minutes. Average results of strength tests on the glass fiber test strips for various formulations are given in Table 1.

TABLE 1

| wt % melamine - wt % Gx - wt % EcoSphere™ | LOI % | Wet kgf | Dry kgf |
| --- | --- | --- | --- |
| 5-2-93 | 44 | 1.8 | 5.8 |
| 10-5-85 | 42 | 3.0 | 7.0 |
| 15-7.5-77.5 | 43 | 3.7 | 7.0 |
| 20-10-70 | 42 | 3.8 | 6.4 |

Example 2

Hydrochloric acid (HCl) was added to dispersions of melamine in water to produce a pH of 3 to 4 at 60 to 70 degrees C. The resulting melamine solution is mixed with EcoSphere™ starch-based nanoparticles, glyoxal (Gx) and polyvinyl alcohol (1:1 mixture of PVOH 107 and PVOH 443) in various concentrations. The resulting binders were applied to glass fiber fabric test strips at various solids concentration and cured at various temperatures for 10 minutes.

Average results of strength tests on glass fiber test strips for the various samples are given in Table 2.

TABLE 2

| melamine - wt % PVOH - wt % EcoSphere™ - wt % Gx - wt % | Total Solids Content (wt %) | Curing Temperature (degrees C.) | LOI % | Wet kgf | Dry kgf |
| --- | --- | --- | --- | --- | --- |
| 20-10-55-15 | 6 | 200 | 30 | 3.6 | 4.9 |
| 30-10-45-15 | 6 | 200 | 31 | 3.7 | 5.2 |
| 40-10-30-20 | 6 | 200 | 34 | 3.8 | 4.4 |
| 20-10-60-10 | 6 | 200 | 29 | 3.0 | 4.3 |
| 20-10-55-15 | 6 | 200 | 30 | 3.6 | 4.9 |
| 20-10-50-20 | 6 | 200 | 31 | 3.5 | 4.9 |
| 20-10-45-25 | 6 | 200 | 30 | 3.6 | 4.4 |
| 30-10-50-10 | 6 | 200 | 27 | 3.5 | 6.2 |
| 30-5-55-10 | 6 | 200 | 31 | 3.2 | 4.8 |
| 30-2.5-57.5-10 | 6 | 200 | 32 | 3.2 | 4.6 |
| 30-10-45-15 | 6 | 140 | 30 | 1.8 | 3.9 |
| 30-10-45-15 | 6 | 160 | 30 | 2.9 | 4.9 |
| 30-10-45-15 | 6 | 180 | 30 | 2.8 | 3.7 |
| 30-10-45-15 | 6 | 200 | 30 | 3.4 | 4.4 |
| 30-10-45-15 | 4 | 200 | 21 | 2.9 | 3.5 |
| 30-10-45-15 | 8 | 200 | 37 | 4.0 | 5.2 |

Example 3

Melamine hydrochloride salt (M.HCl) was prepared separately. The essentially dry salt was mixed with EcoSphere™ waxy corn starch-based nanoparticles, concentrated glyoxal (Gx) solution and polyvinyl alcohol (1:1 mixture of PVOH 107 and PVOH 443) in various concentrations. The resulting binders were applied to glass fiber fabric test strips at a 6 wt % total solids concentration and cured at 200 degrees C. for 10 minutes. Average results of strength tests on glass fiber test strips for the various samples are given in Table 3.

TABLE 3

| wt % M.HCl - wt % Gx - wt % EcoSphere™ - wt % PVOH | LOI % | Wet kgf | Dry kgf |
| --- | --- | --- | --- |
| 40-20-30-10 | 26 | 4.8 | 6.5 |
| 50-25-15-10 | 26 | 4.1 | 4.6 |
| 50-25-15-10 | 26 | 3.9 | 5.9 |

Example 4

Melamine hydrochloride salt was prepared by mixing 10 wt % melamine powder in water. This mixture was heated to 85 degrees C. Hydrochloric acid was then added until the pH was reduced to 3.0. Mixing continued until a clear solution was produced. This solution was cooled at held below 8 degrees C. for 12 hours. Melamine hydrochloride crystals were then filtered from the water and dried at room temperature.

A binder was made by adding PVOH to water and heating to 90 degrees C. Melamine hydrochloride salt as described above was then added. The solution was cooled to 70 degrees C. and glyoxal was added. EcoSphere™ powder was added in portions and dispersed over 30 minutes. The resulting binder consisted of melamine hydrochloride salt (40 wt %), glyoxal (20 wt %), EcoSphere™ (30 wt %) and PVOH (10 wt %) with water to a total solids content of 10%. The PVOH was a 1:1 mixture of PVOH 107 and PVOH 443.

The binder was applied to glass fiber paper and cured at 200 degrees C. for 10 minutes. Average results of strength tests on the glass fiber test strips were 4.8 kgf wet and 7.5 kgf dry at a LOI of 27%.

Example 5

Another binder was made by dissolving melamine in an acidic solution but with citric acid instead of HCl. The resulting binder consisted of melamine (10 wt %), glyoxal (10 wt %), EcoSphere™ (68 wt %), citric acid (11 wt %) and PVOH 518 (1 wt %) with water to a total solids content of 25%. This formulation was stable at room temperature over a one week trial and had a viscosity of 250 cps.

In a TGA test with a temperature increase rate of 10 degrees C. per minute, the binder had a negligible loss of mass at 200 degrees C. This indicates that emissions in most binder applications would be minimal. In particular, there are essentially no formaldehyde, carbon dioxide or ammonia emissions.

The binder was diluted to 6 wt % total solids concentration, applied to glass fiber paper and cured. Strength tests on the glass fiber test strips gave average results of a) 4.1 kgf wet and 7.5 kgf dry at a LOI of 26% and b) 5.0 kgf wet and 9.0 kgf dry at a LOI of 32%, thus representing a significant improvement in performance of this no-added-formaldehyde binder system compared to a conventional PUF formaldehyde based binder resin.

In another test, the binder of this example was mixed 1:1 with a conventional PUF binder. The mixture of binders was stable at room temperature.

Example 6

A binder was made by mixing urea, EcoSphere™, citric acid and PAA in a ratio of 30-60-6-4 by dry weight in water. A sample of the binder at 25 wt % total solids concentration remained stable over a one week trial and had a viscosity of 250 cps. Strength tests on glass fiber test strips gave average results of 3.7 kgf wet and 5.9 kgf dry at a LOI of 29%. In a TGA test with a temperature increase rate of 10 degrees C. per minute, the binder had about 10% loss of mass at 200 degrees C. predominantly as a result of carbon dioxide and ammonia emissions.

Another binder was made by mixing urea, EcoSphere™, citric acid and PAA in a ratio of 40-50-6-4 by dry weight in water. Strength tests on glass fiber test strips gave average results of 3.9 kgf wet and 7.5 kgf dry at a LOI of 36%.

A binder was made by mixing urea, EcoSphere™, citric acid and PVOH 518 in a ratio of 40-53-6-1 by dry weight in water. Strength tests on glass fiber test strips gave average results of 3.8 kgf wet and 7.4 kgf dry at a LOI of 33%.

Example 7

A binder was prepared in a manner similar to Example 5 but with dextrin (molecular weight 65,000) used in place of EcoSphere™. The resulting binder consisted of melamine (10 wt %), glyoxal (10 wt %), dextrin (68 wt %), citric acid (11 wt %) and PVOH 518 (1 wt %) at a solids concentration of 6 wt %. Strength tests on glass fiber test strips gave average results of 3.5 kgf wet and 7.7 kgf dry at a LOI of 35%.

Another binder consisted of melamine (10 wt %), glyoxal (10 wt %), dextrin 65,000 molecular weight (75 wt %), citric acid (5 wt %) at a solids concentration of 6 wt %. Strength tests on glass fiber test strips gave average results of 2.0 kgf wet and 5.2 kgf dry at a LOI of 35%.

Another binder consisted of melamine (10 wt %), glyoxal (10 wt %), a soluble starch for coating paper (C*Film™ 7311 by Cargill) (75 wt %), citric acid (5 wt %) at a solids concentration of 6 wt %. Strength tests on glass fiber test strips gave average results of 2.7 kgf wet and 5.3 kgf dry at a LOI of 35%.

Another binder consisted of melamine (10 wt %), glyoxal (10 wt %), a soluble biopolymer board coating product (C*iCoat™ by Cargill) (75 wt %), citric acid (5 wt %) at a solids concentration of 6 wt %. Strength tests on glass fiber test strips gave average results of 2.5 kgf wet and 6.3 kgf dry at a LOI of 35%.

None of the binders in this Example 7 were stable dispersions. A comparison with Example 5 indicates that, although these binders were able to bind fibers with reasonable strength, they were not as strong as a binder having starch in the form of regenerated nanoparticles.

Example 8

100 parts native waxy corn starch granules, 5 parts citric acid and 10 parts melamine (all based on their dry weight) and water were reacted in a twin screw co-rotating extruder to produce various samples of an extrudate. The extruder was generally as described in U.S. Pat. No. 6,677,386 and International Publication WO 2008/022127. The water was added to give a water content of 8-16 wt % of the total material in the extruder. The extruder had an end die plate temperature of 150 degrees C. Residence time was 18-25 seconds. Specific mechanical energy was 220 J/g. The extrudate was a powder which dispersed when mixed with water at room temperature. A 25 wt % total solids dispersion was stable at room temperature and had a viscosity of 990 cps.

10 wt % Glyoxal was added to the dispersion. The resulting binder consisted of melamine (8 wt %), starch (78 wt %), citric acid (4 wt %) in the nanoparticles and glyoxal (10 wt %) in solution. The binder was diluted to a total solids concentration of 6 wt %, applied to glass fiber paper and cured. Strength tests on glass fiber test strips gave average results of 2.8 kgf wet and 5.9 kgf dry at a LOI of 32% and 3.2 kgf wet and 7.2 kgf dry at a LOI of 38%.

Example 9

A binder was made having 90 wt % of the extruded particles described in Example 8 and 10 wt % glyoxal. This binder had a total solids content of 30 wt % and a viscosity of less than 2000 cps. Another binder was made by mixing extruded particles as described in Example 8 in a 1:1 ratio (by dry weight) with conventional urea formaldehyde (UF) resin used for making wood-based board products. This binder also had a total solids content of 30 wt %. The UF resin only binder was also prepared at a total solids content of 30 wt %. Each binder was used to glue wooden tests strips together in a lap joint and cured. The strength of the bond was tested. Average tested joint strengths were 163 kgf dry and 43 kgf wet for the binder with extruded particles and glyoxal and 170 kgf dry and 112 kgf wet for the binder with extruded particles mixed 1:1 with UF resin. In comparison, the UF resin alone produced average tested strengths of 59 kgf dry and 38 kgf wet. These results indicate that there is an increase in strength in wood-based products when the extruded starch-melamine particles are used as a partial or complete replacement of UF resin.

Example 10

A binder was made having 98 wt % of the extruded particles described in Example 8 and 2 wt % of an epoxidized Pentaerythritol crosslinker. This binder was blended at a 1:1 ratio (by dry weight) with an SB latex binder, coated on paper, and cured. In a Taber wet-rub test, this binder produced a turbidity of less than 60 NTU. In comparison, a binder made with a 1:1 blend (by dry weight) of Eco-Sphere™ and SB latex typically produces a Taber wet-rub score of over 200. These results indicate that a binder of the extruded particles in Example 8 has improved resistance to abrasion compared to a starch nanoparticle binder without melamine when used to coat paper.

We claim:

1. A binder comprising,
a) water;
b) colloid forming particles comprising starch with a molecular weight of at least 100,000 Da dispersed in the water;
c) urea dissolved in the water; and,
d) in addition to the urea, a crosslinker dispersed or dissolved in the water,
wherein the binder comprises at least 20 wt % of urea,
wherein the binder has less than 5 wt % formaldehyde.

2. The binder of claim 1 wherein the crosslinker is glyoxal or citric acid.

3. The binder of claim 1 wherein the colloid forming particles are internally crosslinked.

4. The binder of claim 1 having 10 wt % or less of the crosslinker.

5. The binder of claim 1 having not more than 40 wt % of urea.

6. The binder of claim 1 having not more than 50 wt % of urea.

7. The binder of claim 1 wherein the starch is a cold water soluble starch.

8. The binder of claim 1 wherein the colloid forming particles comprise starch modified by reactive extrusion of native starch granules with water under conditions of temperature and shear sufficient to essentially destroy the structure of the crystalline regions of the native starch granules.

9. The binder of claim 1 wherein the colloid forming particles are made up of at least 80 wt % of the starch.

* * * * *